United States Patent [19]

Baker

[11] 4,156,382

[45] May 29, 1979

[54] BAG SEALER AND CUTTER ASSEMBLY

[75] Inventor: Fred E. Baker, Asheboro, N.C.

[73] Assignee: General Electric Company, New York, N.Y.

[21] Appl. No.: 862,522

[22] Filed: Dec. 20, 1977

[51] Int. Cl.$^2$ ............................................. B30B 15/34
[52] U.S. Cl. .................................... 93/33 H; 83/455; 83/614; 83/649; 156/510; 156/583.1
[58] Field of Search ............... 93/33 R, 33 H; 83/455, 83/614, 649; 156/510, 523, 583

[56] References Cited

U.S. PATENT DOCUMENTS

| | | | |
|---|---|---|---|
| 1,989,945 | 2/1935 | Ritter | 156/583 X |
| 2,067,986 | 1/1937 | Schmidt | 53/130 |
| 2,274,977 | 3/1942 | Currier | 83/614 |
| 2,393,384 | 1/1946 | Kress | 83/614 |
| 3,142,217 | 7/1964 | Busse | 83/614 |
| 3,236,427 | 2/1966 | Martin | 83/614 |
| 3,530,642 | 9/1970 | Leimert | 93/33 R X |
| 3,731,054 | 5/1973 | Bair | 219/243 |
| 3,847,712 | 11/1974 | Hubbard | 156/583 |
| 4,021,290 | 5/1977 | Smith | 156/583 |
| 4,093,500 | 6/1978 | Browne | 93/33 H |

OTHER PUBLICATIONS

Retailing Home Furnishing Daily; Sep. 20, 1976; p. 53.

*Primary Examiner*—Gerald A. Dost

*Attorney, Agent, or Firm*—John F. Cullen; George R. Powers; Leonard J. Platt

[57] ABSTRACT

In a home bag sealer with an elongated box and lid where the box supports a roll of bag material and a heater is provided along the lid opening operative on lid closing to seal a selected size of bag, the device being provided with structure to cut the sealed bag, the invention provides an improved cutter assembly of a lengthwise slot in the lid inboard of the heater and having a pair of oppositely disposed supporting ribs contiguous along the slot substantially the length of the lid. Disposed in the slot is a removable cutter assembly supported on and spanning the ribs on each side thereof for sliding along the slot. The assembly includes a pair of facing nylon brackets each bracket having a leading edge with a narrow notch therein and a faired surface extending away from the notch. A cutter blade is located between the brackets and extends within the notch and an operating handle removably clamps the brackets above the ribs externally of the lid. The entire assembly provides a cutter safely recessed in the brackets whose faired surface rollingly guides material outwardly and away from the blade as the cutter slides lengthwise of the slot to cut a bag to size while being easily removed by snapping the handle off the brackets for replacement of the cutter blade which is always protected from the fingers of the user.

3 Claims, 4 Drawing Figures

BAG SEALER AND CUTTER ASSEMBLY

BACKGROUND OF THE INVENTION

1. Field of the Invention

The invention herein pertains to a lidded box-like home bag sealer which seals a polyethylene bag by pressing a lid against a resistance wire heater on the box and then cutting the bag to size by sliding a cutter assembly lengthwise of the lid to make any selected size bag, the invention residing in an improved cutter means assembly which is readily replaceable by the user and carries a cutting blade that is safely protected and impossible to touch with the fingers when in use on the sealer.

2. Description of the Prior Art

Home bag sealers have come into vogue for various household chores such as sealing leftovers to retain the nutrients and the cooking juices and for many other uses. Development of the boilable plastic bag in which food may remain sealed in the bag so that it may be dropped directly into boiling water has come into use and is available. Such bags that withstand cooking temperatures usually are of a polyethylene inner liner with a separate outer higher temperature resisting plastic layer so that the two-part bag may be sealed to the polyethylene with the outer tougher material protecting against boiling temperatures so the bag may be placed in boiling water. Generally the bags may be separate and hung on pegs on the bag sealer or may comprise a roll carried in the bag sealer that is pulled out to make any selected size bag desired merely by closing the lid to fuse the plastic and seal the surface along the heater between the lid and box. Additionally, cutting means may simultaneously cut near the sealed area or comprise a separate razor slidable lengthwise of the lid to part the bag. Generally, any sharp knife or razor edge presents a problem of safety to exposed cutting surfaces and they may be permanently sealed in the cutter assembly preventing replacement.

SUMMARY OF THE INVENTION

Briefly described, the invention is directed to a home bag sealer of an elongated box and lid where the box supports a roll of bag material and contains a resistance wire heater along the lid opening operative on lid closing to seal a selected size of bag and containing structure to cut the sealed bag. A combination of this general type is shown in U.S. Pat. No. 3,731,054. To this general combination the invention provides an improved cutter assembly of a lengthwise slot in the lid inboard of the heater, the slot having a pair of oppositely disposed supporting ribs contiguous substantially the length of the lid. For cutting selected size bags from a continuous roll, removable cutter assembly is disposed in the slot and is supported on and spans the ribs on each side thereof for sliding along the slot. The cutter assembly includes a pair of facing symmetrical plastic brackets each having a leading edge with a narrow notch therein and a dish shaped faired surface extending away from the notch. A cutter blade is disposed between the brackets and extends within the notch and an operating handle removably clamps the brackets above the ribs externally of the lid. This entire cutter assembly provides a cutter safely recessed in the brackets with the faired surfaces rollingly guiding the bag material outwardly and away from the blade as the cutter slides lengthwise in the slot to cut a bag to size. The assembly is easily removed by snapping the handle off the brackets for separation from the slot for replacement of the cutter blade which is always protected from the fingers of the user. Thus, the main object of the invention is to provide a simple plastic cutter assembly that inherently protects the user by making it impossible to touch the exposed cutting edge when in operation while, at the same time, being easily disassembled for cutter replacement by the user.

DESCRIPTION OF THE PREFERRED EMBODIMENT

Figure 1:
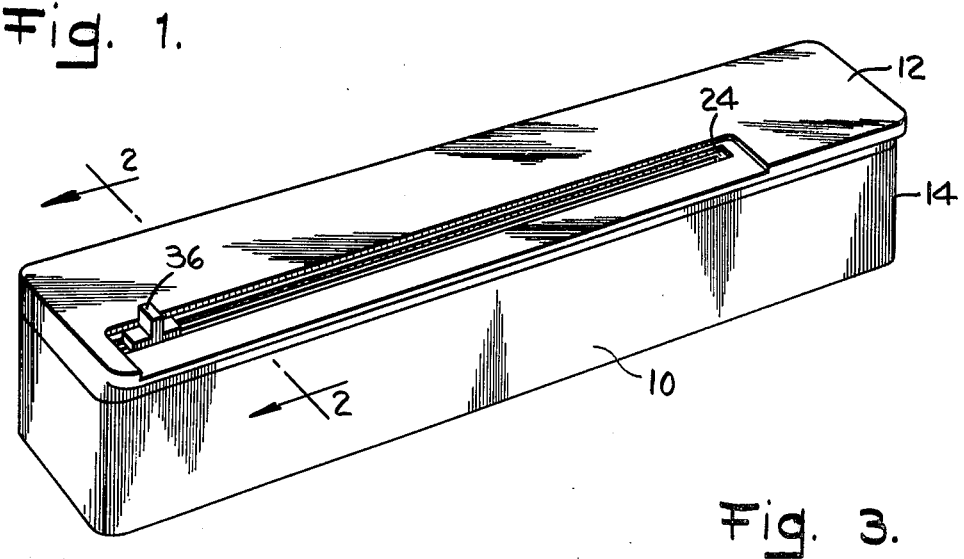
FIG. 1 is a perspective view of the box shape with the cutter assembly in place.

Referring to FIG. 1, there is shown a typical home bag sealer of a known type that uses a lidded elongated box 10 for making and heat sealing flexible plastic bags for many household uses. Box 10 is provided with a hinged lid 12 and contains internal electrical mechanism not shown at one end 14 which, upon pressure on lid 12, heats an electrical element in the form of a heater such as a resistance wire heater 16 along the lid opening area 18 with the lid operative to actuate the heating mechanism by operating a switch not shown as the lid is pivoted closed in the direction shown in FIG. 2.

Figure 2:
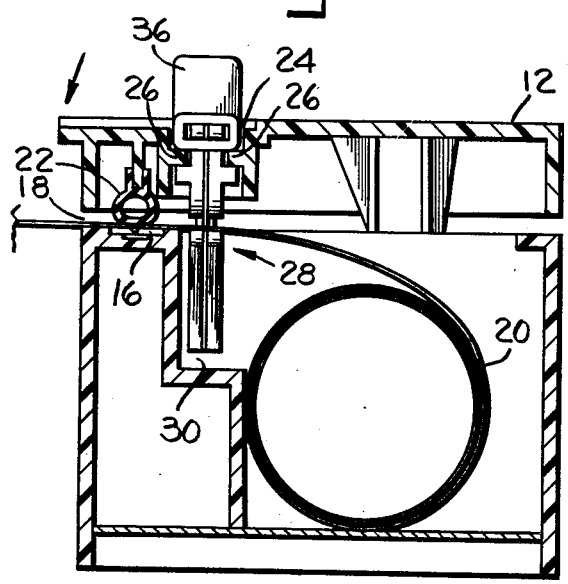
FIG. 2 is a sectional view on line 2—2 of FIG. 1.

Various selected sizes of plastic bags may be formed from a suitable roll 20 of bag material that is dispensed by pulling it out the front of box 10 as shown in FIG. 2 to any suitable length desired. For sealing, a suitable flexible and deformable member 22 is carried by the lid lengthwise thereof and presses the material of roll 20 against heater 16 while the lid simultaneously activates heater 16 and a seal is formed by fusing the material. When a roll of material 20 is used, as opposed to preformed individual bags, it is necessary to cut the formed bag and this may be done simultaneously as in said U.S. Pat. No. 3,731,054 patent or provided, as known, with a suitable slicing cutter that is pulled across the surface of the bag.

These types of cutting means provide either a more complex structure or dangerous exposed edges and it is to avoiding these that the present invention improves. In accordance with the invention, an improved cutting means is provided that comprises a lengthwise slot 24 disposed in the lid substantially the entire length thereof or at least well beyond any bag width, and, as seen in FIG. 2, the slot is disposed inboard of heater 16 so the sealed bag may be cut free from the roll. For supporting a cutter assembly, the lid slot 24 is provided with a pair of vertical oppositely disposed supporting ribs 26 recessed in the lid surface and contiguous along slot 24 from one end to the other. The ribs form the entire support for a removable cutter assembly generally indicated at 28 and carried by ribs 26 in a depending fashion as shown in FIG. 3 extending vertically down for free sliding in any suitable niche 30 in the box.

Figure 3:
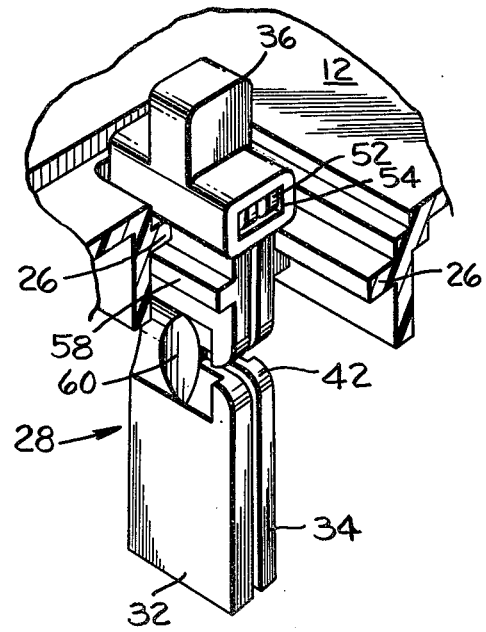
FIG. 3 is an enlarged partial perspective of the assembled cutter assembly.
Figure 4:
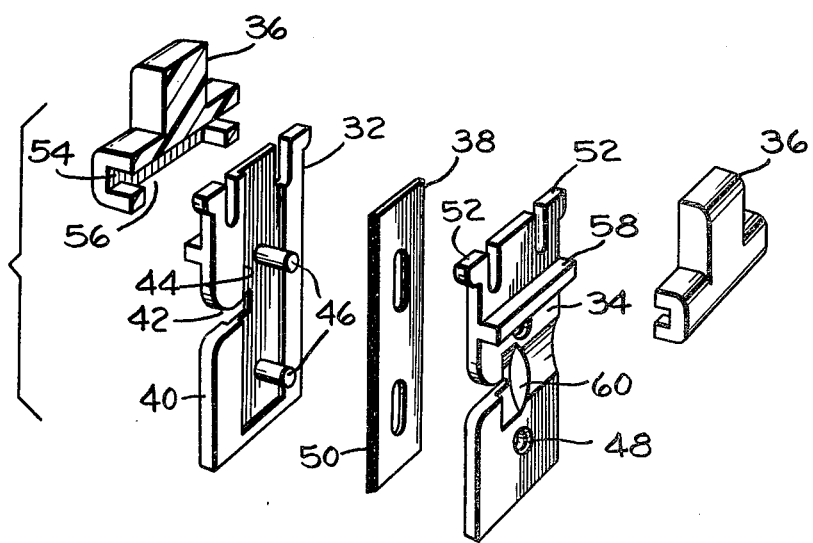
FIG. 4 is an exploded view of the parts of the removable cutter assembly.

The four component parts of the cutter assembly are shown in FIG. 4 and include a pair of facing symmetrical brackets 32 and 34, a single handle 36 shown in two parts for convenience, and a standard razor injector blade 38. For easy removal by the user as necessary, the entire cutter assembly may be molded of flexible plastic, such as nylon, with the entire device being supported against vertical movement by ribs 26 for sliding in slot 24 to cut the formed bag. To hold the cutter, each of the brackets 32 and 34 are symmetrical and face each other and each is supplied with a leading edge 40 and molded with a narrow notch 42. The brackets 32 and 34 mate when pressed together as shown in FIG. 3 to provide a continuous notch across the leading edge. The brackets may be designed to fit closely together by recess 44 to safely contain blade 38. The blade is fixed by providing the brackets with suitable locating means such as pins 46 and holes 48 to align with the standard blade 38 to hold the parts together as by an interference fit or alternatively by staking the pins. 38. For protection, the brackets are sized so that the cutting edge 50 is well inside and faces notch 42 as shown by the outline of recess 44 when the cutter assembly is complete as shown in FIG. 3. Thus, it is inherently impossible for the user to touch the cutting edge facing the notch and access is had only to the plastic components. For securing the brackets and cutter blade together, the brackets are provided with flexible tab end means 52 that cooperate with end openings 54 in the handle so that the brackets and single removable handle may be pushed together deforming tabs 52 inward to force them up into an opening 56 in the bottom of the handle whereupon the tabs snap out into openings 54 with the handle helping to hold the entire assembly together as shown in FIG. 3. For smooth sliding and supporting fit, the brackets have molded cooperating ribs 58 that fit below supporting ribs 26 on the lid. The bottom surface of handle 36 forms the entire cutter assembly support riding along the top surface of ribs 26 so that the entire cutter assembly spans ribs 26 on both sides for smooth supporting action with the assembly depending into the box.

To prevent jamming of the boilable plastic bag material, each of the brackets 32 and 34 is provided with a faired surface 60, faired meaning it is curved approximately 180° in a dish-shape and disposed or extending from the notch outwardly of the bracket as shown in FIGS. 3 and 4. This symmetrical defined faired surface, one on each bracket, feeds the cut boilable plastic bag material by rolling it away and outwardly from the cutting edge outwardly to part it for smoother cutting operation without jamming.

Thus, the present invention provides an inexpensive, easily formed cutter assembly that may be of molded plastic, that takes standard injector razor blades, that can be easily snapped apart by the user by merely lifting the lid and snapping off the depending bracket below from the handle portion for cutter replacement if desired and then snapping them together again as the sole support of the cutter blade, that provides a cutter assembly where it is impossible for the user to touch the cutting edge and is therefore completely safe, that cleanly cuts boilable plastic bag material, and that is entirely concealed by extending substantially vertically into the box with only a small handle 36 on the outer surface of the lid.

While I have hereinbefore described a preferred form of the invention, obvious equivalent variations are possible in light of the above teachings. It is therefore to be understood that, within the scope of the appended claims, the invention may be practiced otherwise than as specifically described, and the claims are intended to cover such equivalent variations.

I claim:

1. In a home bag sealer with a lidded elongated box supporting a roll of bag material, a heater along the lid opening operative on lid closing to seal a selected size of boilable bag, and means to cut the sealed bag, an improved cutting means comprising,
   - a lengthwise slot in the lid inboard of said heater with a pair of vertically and oppositely disposed supporting ribs contiguous along the slot,
   - a removable cutter assembly supported on and spanning the ribs on each side for sliding in said slot, said assembly including
   - a pair of facing brackets,
     - each having a leading edge with a narrow notch therein,
     - a dish-shaped faired surface extending from the notch outwardly of each bracket,
   - a cutter blade supported between the brackets within the notch, and
   - operating handle means removably clamping said brackets above the ribs externally of the lid,
   - whereby the cutter is removably and safely recessed in the brackets whose faired surface rollingly guides material outwardly and away from the blade as the cutter assembly slides lengthwise of the lid slot.

2. Apparatus as described in claim 1 wherein said brackets are symmetrical and support a standard injector blade facing the notch and the cutter assembly is supported on said lid with the brackets extending substantially vertically therein.

3. Apparatus as described in claim 2 wherein said cutter assembly is plastic with flexible tab means between the brackets and handle for snap separation thereof to remove said assembly.

* * * * *